United States Patent [19]

Dorgebray

[11] 3,886,977
[45] June 3, 1975

[54] PLUG FOR PIPES UNDER PRESSURE
[76] Inventor: Gérard Dorgebray, La Chaussee, d'Ivry, France, 28260
[22] Filed: July 27, 1973
[21] Appl. No.: 383,107

[30] Foreign Application Priority Data
Aug. 4, 1972 France .............................. 72.28206

[52] U.S. Cl. .................................. 138/89; 220/24.5
[51] Int. Cl. ............................................ F16l 55/12
[58] Field of Search ................ 138/89, 90; 220/24.5

[56] References Cited
UNITED STATES PATENTS

| | | | |
|---|---|---|---|
| 2,329,801 | 9/1943 | Wellborn | 138/89 |
| 2,870,794 | 1/1959 | Thaxton | 138/90 |
| 2,974,685 | 3/1961 | Ver Nooy | 138/90 |
| 3,323,551 | 6/1967 | Bell et al. | 138/90 |

Primary Examiner—Charles A. Ruehl
Attorney, Agent, or Firm—Brisebois & Kruger

[57] ABSTRACT

Plug for use with a machine for perforating pipes, and making it possible to carry out maintenance operations and alterations on the valves and ends of pipes under pressure which plug comprises two end plates which are coaxial and each of which comprises a frusto-conical surface facing the frusto-conical surface of the other, said surfaces having the same taper, a plurality of gripping jaws in the form of circumferentially spaced sectors of a ring occupying the space between the frusto-conical surfaces of the two end plates, a retaining spring for holding the sectors in position, a sealing plate having an annular sealing member attached to one of the end plates, and means for producing relative movement between the two end plates.

The principal applications of the plug are for the replacement of a valve, the repair of a pressure valve, and the extension of a pipe which is in service without requiring the previous mounting of a special flange.

5 Claims, 4 Drawing Figures

PLUG FOR PIPES UNDER PRESSURE

SUMMARY OF THE INVENTION

This invention relates to a plug for pipes under pressure which makes it possible to carry out various maintenance and extension operations on the pipes while they remain under pressure. There are known types of plugs provided with cams which engage in a neck provided in a special flange which is first mounted at this point on the pipe. In order to place such a plug in position by means of a machine for piercing the pipes while under pressure, it is necessary to locate the annular flange and maneuver the control for the cams so that they move outwardly of the plug to fasten it to the flange. This type of plug can only be mounted on an annular flange especially provided for this purpose and its use is thus limited to points at which such flanges have been located during the original installation of the pipe or when the pressure to this part of the system has been cut off. Any piercing of the pipe at other points requires cutting off of the pressure, or at least the isolation of a part of the system by means of valves, when this is possible.

The present invention makes it possible to overcome this disadvantage by making the operations of valve repair or the extension of any cylindrical pipe maintained under pressure possible without having first mounted a special flange on the pipe.

The plug for a pipe under pressure according to the invention consists of two coaxial end plates mounted for axial translation with respect to each other and each being provided with a frusto-conical peripheral surface facing the corresponding surface of the other plate and having the same taper, a plurality of gripping jaws consisting of a plurality of spaced sectors of a ring, the cylindrical exterior of which has a diameter approximately the inner diameter of the pipe to be blocked, said sectors occupying the space between the frusto-conical surfaces of the end plates, means for retaining said sectors in said space, sealing means mounted on one of the end members, and means for controlling the relative movement of the end plates.

In a preferred embodiment, the means for controlling the movement of the end plates comprises a spigot which is threaded into one of the end plates and passes through the other end plate, the end of said spigot being axially tapped to receive a threaded control rod, and a nut screwed on the threaded spigot and bearing against an abutment on the other end plate.

In one embodiment particularly adapted to pipes having large diameters or under high pressure, roller or ball bearings are positioned between the end plate and the sectors of the jaws.

In several embodiments of the invention the sealing means consists of an annular sealing member positioned in a groove in the periphery of a removable disc mounted on the end plate occupying the innermost position in the pipe.

In an embodiment particularly adapted to pipes in which high pressures are developed, the sealing means consists of a sealing ring which is deformable and compressible, mounted on one of the two end plates, which plate consists of two parts which grip the sealing ring, one of which parts is provided with a threaded spigot and the other which is annular and traversed by said threaded spigot and provided with a frusto-conical surface against which the sectors of the jaw bear.

In these embodiments, the means for retaining the sectors of the jaw consists of a spring seated in a circular groove in the median plane of the sectors.

The invention will be better understood from the following description given purely by way of example of two embodiments of the invention illustrated in the accompanying drawings, in which.

Figure 1:
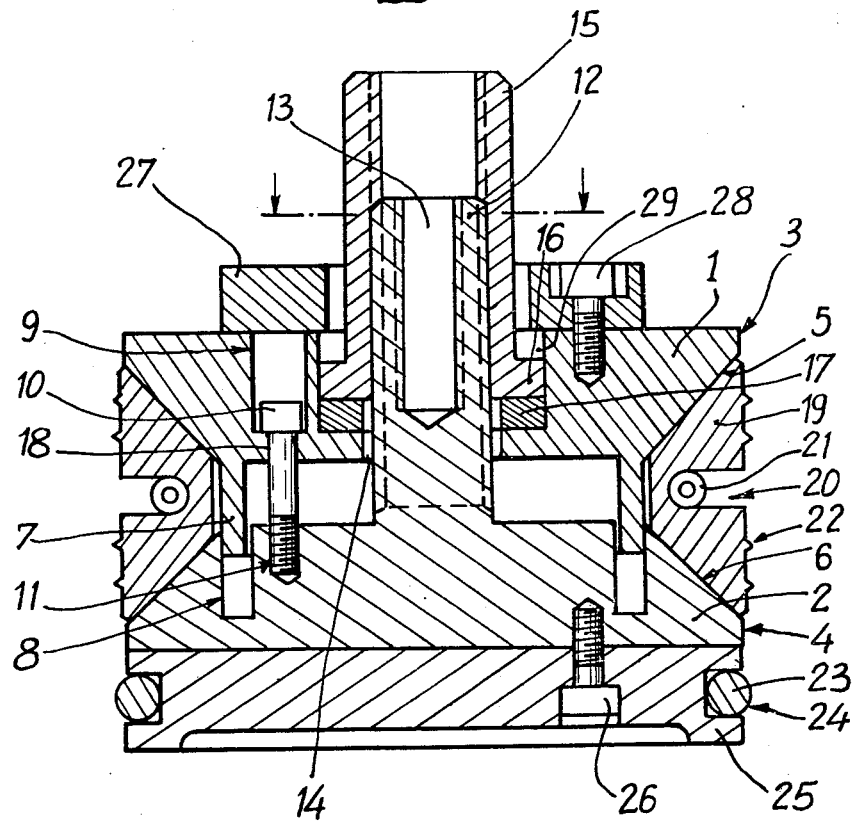
FIG. 1 is an axial sectional view taken through a first embodiment of the invention.
Figure 1A:
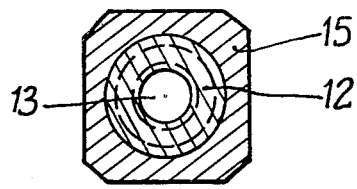
FIG. 1a is a transverse sectional view taken along the line A—A of FIG. 1.

Referring now to FIG. 1, this figure shows two end plates 1 and 2, both symmetrical about an axis of revolution except for the bores therein receiving screws. These two end plates are coaxial and each comprises cylindrical parts (3 and 4 respectively) having a diameter slightly less than the minimum inner diameter of the pipe for a given nominal outer diameter, and a frusto-conical part (5 and 6 respectively). These latter parts are face to face and have the same apex angle. The amount of this apex angle is dependent on the nominal diameter of the pipe to be plugged, the type of metal, the operating pressure, the temperature and the nature of the fluid to be transported. The figure illustrates an embodiment adapted to a pipe having a nominal diameter of 100 millimeters for petroleum products at a pressure less than 40 bars and an apex angle of 90°.

The end plate 1 has, at the inner end of the frusto-conical surface, a cylindrical tubular part 7 which slides in a groove 8 in the end plate 2, the width of which is greater by several tenths of a millimeter than the thickness of the tubular part 7.

The end plate 1 has three eccentric cylindrical bores 9 the major part of which has a diameter greater than that of the heads of the screws 10. These screws 10 serve to limit the separation of the end plates 1 and 2 and prevent any relative rotational movement between one end plate and the other. The remainder of the hole 9 has a diameter which permits the free passage of the unthreaded portion of the said screws. The threaded part of each screw is screwed into a matingly threaded bore 11 in the inner surface of the end plate 2.

The end pate 2 carries on its inner surface a cylindrical axially threaded spigot 12 having in its end a coaxial tapped bore 13. The spigot 12 passes through an axial cylindrical hole 14 in the end plate 1.

A hollow, externally square nut 15 is screwed onto the external threads of the spigot 12 and has an enlarged base 16 resting on a ring 17 resting on a shoulder 18 in the hole 14.

The ring 17 is made of bronze for plugs having a nominal diameter of 100–500 millimeters. It may be provided with ball bearings or roller bearings in the case of pipes of larger diameter.

The clamping jaws 19 comprise a plurality of circumferentially spaced sectors of a ring having a cylindrical periphery, the diameter of which approximates the inner diameter of the pipe to be plugged, said sectors occupying the space between the frusto-conical surfaces of the end plates. The cutting of the ring into sectors results in the removal of 3–5 millimeters of metal which allows for the approach of the sectors required to obtain disconnection and bring the outer periphery of the sectors within the circumferential periphery of the end plates 1 and 2. The number of sectors is 6 for pipes having a nominal diameter up to 150 millimeters. Beyond that the number increases to keep the peripheral contour of the sectors at a substantially constant circumference.

The jaws are customarily made of treated carbon steel. If more deformable silicon steel is used the diameter of the ring must be made equal to the average inner diameter of the pipe for a given nominal diameter.

The jaws have a groove 20 in the median zone of their cylindrical outer surface, in which groove a helical spring 21 is positioned. This spring constitutes both the means for retaining the sectors and for separating them from the wall of the pipe.

The sectors of the jaw have on their outer periphery small projections 22. An annular sealing ring 23 is positioned in a groove 24 in the cylindrical surface of a sealing plate 25 attached by three hollow-head hex screws 26 to the circular base of the end plate 2.

A cap 27 which receives the spigot and the square nut 15 limits the path of travel of the base 16 of the square nut and closes the ends of the bores in the end plate 1, to which it is attached by three screws 28.

The distance between the base 16 of the nut 15 and the cap 27 provides a play 29 the reduction of which serves an important purpose in the preliminary mounting stage.

Figure 2:
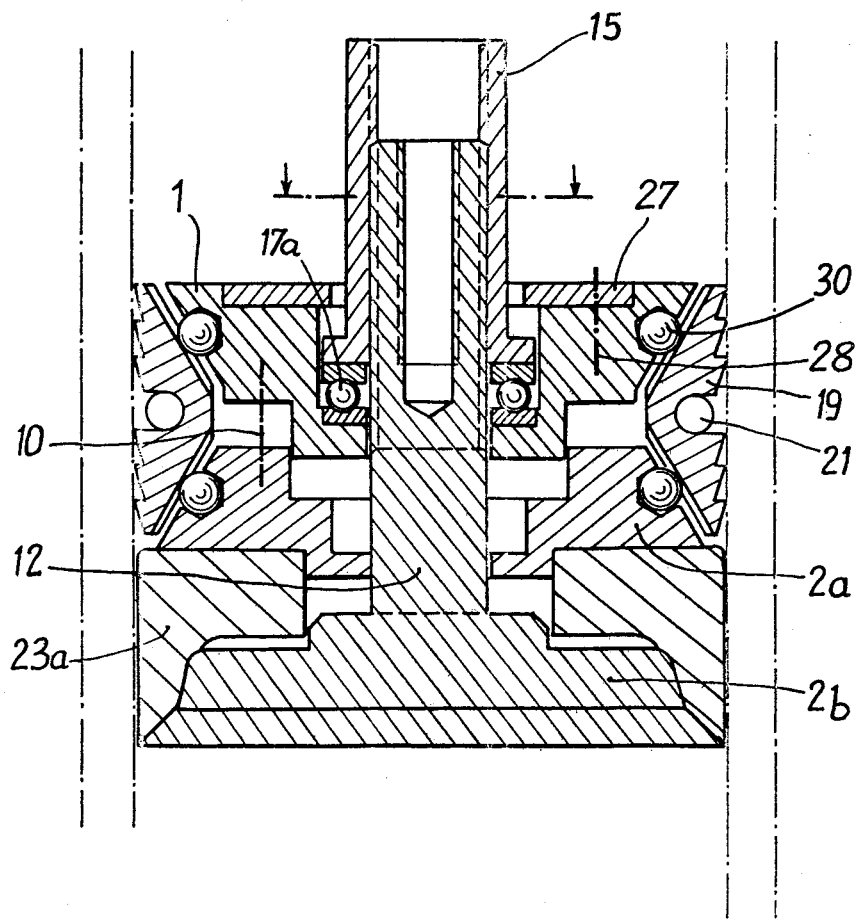
FIG. 2 is an axial section taken through a second embodiment of the invention.
Figure 2A:
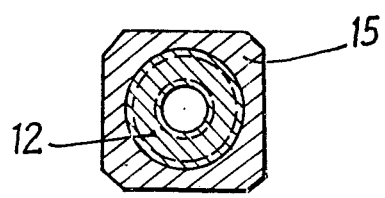
FIG. 2a is a transverse sectional view taken along the line B—B of FIG. 2.

FIG. 2 shows a plug in an embodiment which is particularly adapted for use in pipes under a pressure greater than 40 bars.

The end plate 1 is the same as in FIG. 1. On the contrary, the other end plate consists of two parts, one of which (2b) is provided with a threaded spigot 12 and the other of which (2a) is annular and is traversed by said threaded spigot, and is provided on its external periphery with a frusto-concial surface against which the sectors of the jaws 19 bear. Between the two parts 2a and 2b is a deformable and compressible sealing ring 23a. Ball bearings 30 are inserted between the end plates and the sectors constituting the jaws.

For simplicity, the drawing shows only the axes of the holding screws 10, the screw 28, which attaches the cap 27, and periphery of the helical spring 21. The base of the square nut rests on the ball bearing 17a.

The plug for pipes under pressure according to FIG. 1 operates in the following manner when used to replace a valve in an installation which is in use.

Regardless of the manner in which the valve is to be attached, whether it is to be screwed in, bolted down, or welded in place, a tapping machine for piercing the pipe under pressure, hereinafter referred to as the machine, is placed in position on the outer flange or the external threads of the valve.

The machine is used in this operation as manipulating means because it has components which permit it to transmit translational and rotary movement. The machine carries the plug held by both a square socket fitting onto the square nut 15 and by a threaded rod screwed into the tapped hole 13 approximately half way up the threads of the tapped hole.

The threaded rod is free to rotate in the machine, not shown, but is fixed to the socket for translational purposes by means of a stop disc. Beyond this stop, the end of the rod is sleeved in a square female sleeve which holds the square end of the operating extension which itself terminates in a wheel, which may be hand actuated.

It should be noted that the square head of the nut 15 is adapted to be driven by a machine having a driving socket with a square prismatic opening therein so that for certain machines in which the driving socket is provided with a square frusto-pyramidal opening an adaptor must be provided. Once the machine is mounted in position, the drive member is pressed against the cap 27 and all sealings have been assured, the valve having an integral passage is opened, and by translational movement of the drive member of the machine on which the plug has already been mounted by screwing the threaded rod into the hole 13, the plug is driven through the valve and placed in position in the pipe.

The two end plates are prevented from rotation by the holding screw 10 so that the rotation of the threaded rod, which causes it to be screwed into the tapped hole 13 has the effect of translating the spigot and consequently the end plate 2 with respect to the plate 1. The consequent relative approach of these two end plates expands the members of the jaw which enter into contact with the internal wall of the pipe. This displacement of the end plate 2 and the nut 15 remains less than the play 29. The distance offered by the start of the attachment indicates the stopping of the rotation of the rod by hand.

The rotation of the drive member of the machine then turns the nut 15 on the spigot 12 which brings the end plates together and consequently locks the jaws in place. When the air-lock of the machine is brought to atmospheric pressure the annular sealing ring becomes effective. With the plug in place the machine and the valve are removed, a new valve is installed in open position and then the machine is again put in place. By an inverse maneuvering thereof the plug is loosened and withdrawn through the valve, the latter is closed and the machine carrying the plug is removed. An analogous operation may be carried out in the following cases:

Replacement of a welded valve by a clamped valve or vice versa.

Extension of a service line the previously unused end having been closed by a rounded end member or by a plate on a clamp, a plug having been positioned in the pipe during the construction of the installation. This extension may be carried out at the end of the line, or of a branch.

Repair of a pressure valve.

It should be noted that the sealing plate has been provided separate from the end plate 2 to which it is attached both in order to simplify the machining and for reasons of convenience during use.

For a nominal outer diameter of the pipe and a selected thickness of metal chosen as a function of the pressure therein and of the fluid transported, a particular annular sealing ring must be selected. It is then desirable that it be possible to use other plates with sealing rings of different types first mounted thereon in the shop. This interchangeability of the plates is the more valuable to the extent that the sealing rings may not only be of different external contours but even of different structures, and in this case different designs of the groove 24 must be provided.

The plug according to the invention is thus characterized by its great adaptability in use, both by the elimination of the use of special flanges which must be previously mounted in place, and by the possibility of connecting to the part of the apparatus which fastens it to pipes of different interior dimensions a sealing plate adapted to the nature, pressure, and temperature of the fluid being transported.

In the embodiment of FIG. 2, which is especially adapted to pipes in which the pressure is greater than 40 bars, the operation is the same as for a plug according to the embodiment of FIG. 1. It must nevertheless be noted that the traction which is exerted on the spigot 12, first during the screwing of the threaded rod into the tapped hole, and then by the screwing of the nut 15 not only actuates the sectors of the jaw and causes their attachment to the pipe wall, but also causes the compression of the deformable and expandable sealing ring so as to assure a seal as tight as required by the pressure to which it is subjected.

The plug according to the invention has been used to facilitate maintenance and extension work on networks of oil and gas pipes. The embodiment used in a petroleum refinery has been the one shown in FIG. 1 and its use on installations under high pressure then lead to the development of the embodiment according to FIG. 2. The employment of the plug in accordance with the invention may be extended to all industrial chemical installations in which the problems of the repair and maintenance of the valves and the extension of pipes occur, when it is advantageous to carry out these operations without stopping the process.

What is claimed is:

1. Plug for pipe under pressure which comprises two coaxial end plates which are mounted for relative translation, each having a peripheral frusto-conical surface facing the other and having the same taper, a plurality of jaws consisting of a number of circumferentially spaced sectors of a ring having a cylindrical circumferential surface, the diameter of which surface approximates the inner diameter of the pipe to be plugged, said sectors occupying the space between the two frusto-conical surfaces of the end plates, means for retaining said sectors in said space, sealing means mounted on one of the end plates and constituting with said one end plate a closure completely blocking said pipe, a threaded spigot fixed to one of the plates and passing through the other, the end of said spigot being axially tapped to receive a threaded operating rod, a nut screwed onto the outside of said spigot and overlapping said other end plate, and at least one elongated connecting means extending between said coaxial end plates, parallel to the axis of said end plates and preventing relative rotation of said end plates, one end of each connecting means being longitudinally slidable within one of said end plates between fixed abutments which limit the axial movement of said end plates relative to each other.

2. Plug as claimed in claim 1 comprising rotatable bearings mounted between the end plates and the sectors.

3. Plug as claimed in claim 1 comprising a removable disc mounted on the end plate carrying said spigot, and in which said sealing means comprises an annular sealing ring mounted in a groove in the periphery of said disc.

4. Plug as claimed in claim 1 in which the sealing means comprises a compressible, deformable sealing member mounted on one of the two end plates, said one end plate being made in two parts between which said sealing member is gripped, one of said parts carrying said threaded spigot and the other being annular and pierced by said threaded spigot and having a frusto-conical surface against which the sectors of the jaw bear.

5. Plug as claimed in claim 1 in which the means for retaining the sectors of the jaw comprise a spring seated in a circular groove in the median plane of the sectors.

* * * * *

UNITED STATES PATENT OFFICE
CERTIFICATE OF CORRECTION

PATENT NO. : 3,886,977
DATED : June 3, 1975
INVENTOR(S) : GERARD DORGEBRAY

It is certified that error appears in the above-identified patent and that said Letters Patent are hereby corrected as shown below

[73] Assignee: ELF UNION
Paris, France

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*